(12) United States Patent
Butz et al.

(10) Patent No.: US 7,905,643 B2
(45) Date of Patent: Mar. 15, 2011

(54) LIGHT, ESPECIALLY A REAR LIGHT FOR MOTOR VEHICLES, IN ADDITION TO A CARRIER, PREFERABLY FOR SAID TYPE OF LIGHT

(75) Inventors: Thomas Butz, Ulingen (DE); Thomas Manth, Aachen (DE); Veit Schwegler, Stuttgart (DE); Cem Olkay, Witten (DE)

(73) Assignee: Odelo GmbH, Schwaikheim (DE)

( * ) Notice: Subject to any disclaimer, the term of this patent is extended or adjusted under 35 U.S.C. 154(b) by 1297 days.

(21) Appl. No.: 10/543,971

(22) PCT Filed: Jan. 16, 2004

(86) PCT No.: PCT/DE2004/000048
§ 371 (c)(1),
(2), (4) Date: Jun. 26, 2006

(87) PCT Pub. No.: WO2004/068028
PCT Pub. Date: Aug. 12, 2004

(65) Prior Publication Data
US 2006/0250812 A1 Nov. 9, 2006

(30) Foreign Application Priority Data
Jan. 31, 2003 (DE) .................................. 103 04 832

(51) Int. Cl.
*F21S 8/10* (2006.01)
(52) U.S. Cl. ........ 362/545; 362/541; 362/542; 362/543; 362/544

(58) Field of Classification Search .......... 362/540–545, 362/507, 487, 498, 499
See application file for complete search history.

(56) References Cited

U.S. PATENT DOCUMENTS

| 2,343,754 | A | * | 3/1944 | Donley .......................... 362/540 |
| 4,874,913 | A | | 10/1989 | Aoki et al. |
| 5,404,282 | A | | 4/1995 | Klinke et al. |
| 5,490,049 | A | | 2/1996 | Montalan et al. |
| 5,510,326 | A | * | 4/1996 | Noire .............................. 512/11 |
| 6,406,173 | B1 | | 6/2002 | Serizawa et al. |
| 6,659,632 | B2 | * | 12/2003 | Chen ............................. 362/545 |
| 7,066,631 | B2 | * | 6/2006 | Davies et al. ................. 362/517 |

FOREIGN PATENT DOCUMENTS

| DE | 100 20 099 A | 10/2001 |
| JP | 10 144113 A | 5/1998 |

* cited by examiner

*Primary Examiner* — Anabel M Ton
(74) *Attorney, Agent, or Firm* — Laurence A. Green; Werner H. Stemer; Ralph E. Locher

(57) ABSTRACT

The invention relates to a light comprising a carrier (3) which has at least one lighting means (4) and which is arranged behind a light pane (12). The aim of the invention is to form a light or a carrier which can be produced in a simple and economical manner and which can be mounted in a small space. The lighting means (4) are arranged on the carrier (3) in such a manner that they essentially correspond to the contour of the light pane (2) and the lighting means (4) is placed in a horizontal manner on one side of the carrier (3) so that the carrier (3) and the lighting means (4) require very little space. The carrier (3) and the light are used in motor vehicles.

13 Claims, 5 Drawing Sheets

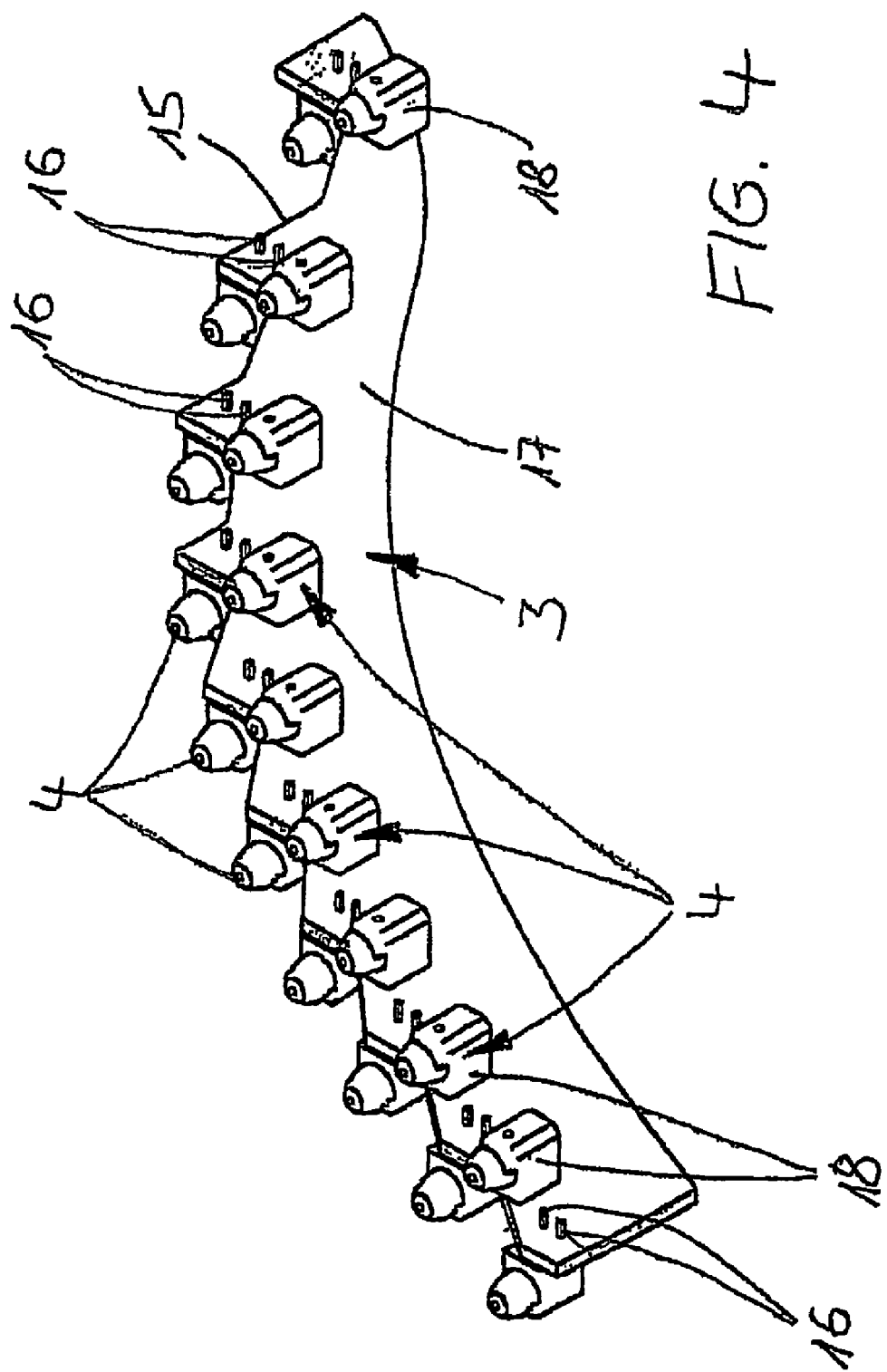

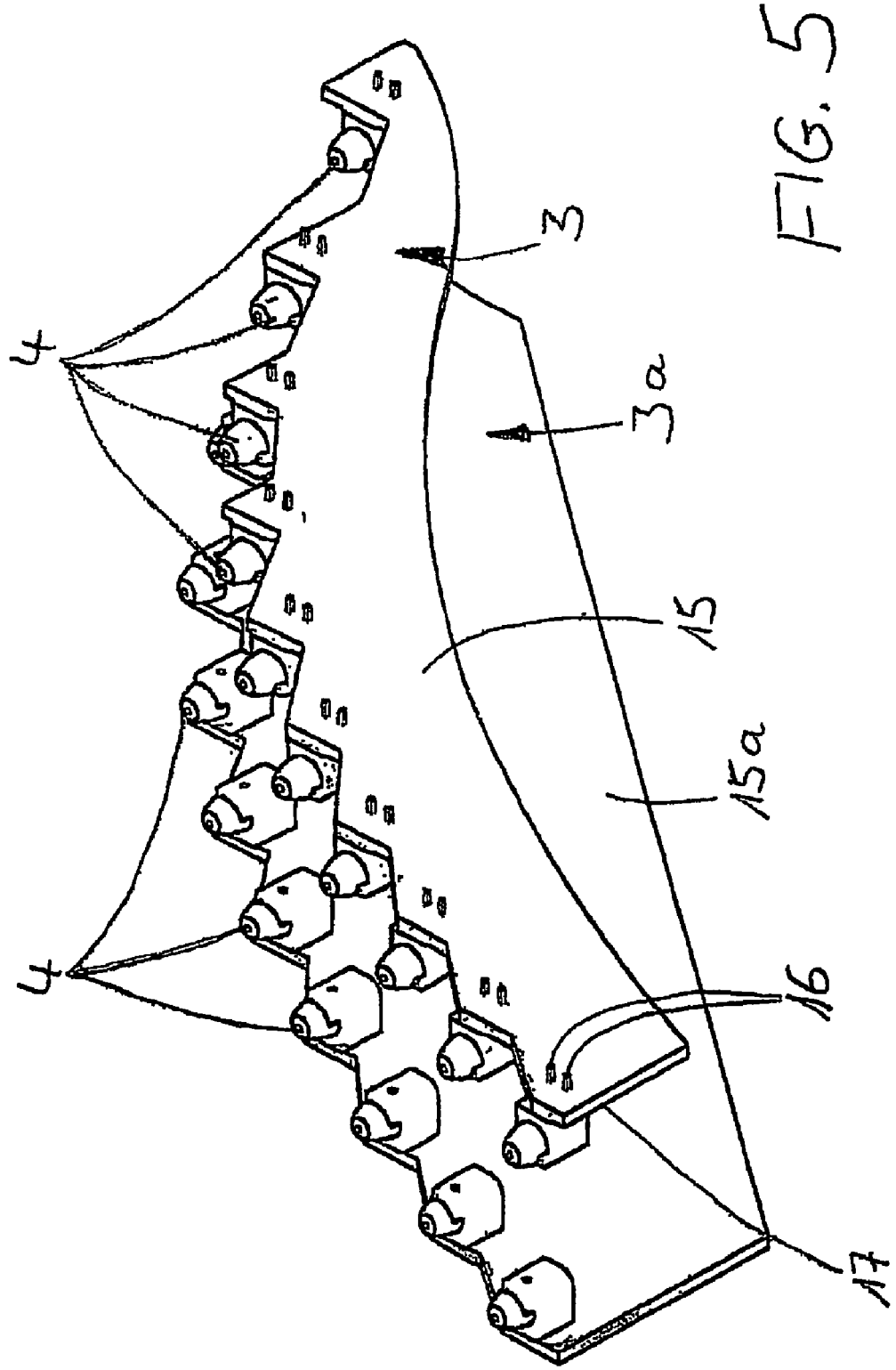

LIGHT, ESPECIALLY A REAR LIGHT FOR MOTOR VEHICLES, IN ADDITION TO A CARRIER, PREFERABLY FOR SAID TYPE OF LIGHT

CROSS-REFERENCE TO RELATED APPLICATIONS

This application is a National Stage of International Application No. PCT/DE2004/000048 filed Jan. 16, 2004, which claims priority to German Patent Application No. DE 103 04 832.4 filed on Jan. 31, 2003. The disclosures of the above applications are incorporated herein by reference.

FIELD OF THE INVENTION

The invention relates to a light, especially a rear light for motor vehicles, and a carrier, preferably for such a light.

BACKGROUND OF THE INVENTION

In order to place the lighting means as close as possible to the contour of the light or light pane, it is known to attach the lighting means to partial plates that are situated in a stepped fashion in relation to one another and connected to one another by cable. This embodiment requires a large amount assembly effort and easily leads to assembly errors. The lighting means are also situated standing up from the plates, thus requiring a lot of installation space.

The object of the invention is to embody a light and a carrier of this kind in such a way that it is easy and inexpensive to manufacture and can be mounted in small installation spaces.

This object is attained by a light of the species-defining type and by a carrier of the species-defining type.

SUMMARY OF THE INVENTION

As a result of the embodiment according to the present invention, the lighting means are situated at an edge of the carrier adjacent to the light pane so that they essentially follow the contour of the light pane. Since the lighting means are situated lying against the side of the carrier, the carrier with the attached lighting means takes up only a small amount of space. This allows the carrier according to the invention to also be easily accommodated in small installation spaces, even if the carrier is equipped with a large number of lighting means.

Other features of the invention ensue from the remaining claims, the specification, and the drawings.

The invention will be explained in greater detail below in conjunction with several exemplary embodiments shown in the drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DESCRIPTION OF THE DRAWINGS

FIG. 4 is another embodiment form of a carrier equipped with lighting means in a depiction that corresponds to that in FIG. 2, FIG. 5 is a perspective view of two adjacent carriers equipped with lighting means.

DETAILED DESCRIPTION OF THE PREFERRED EMBODIMENTS

Figure 1:
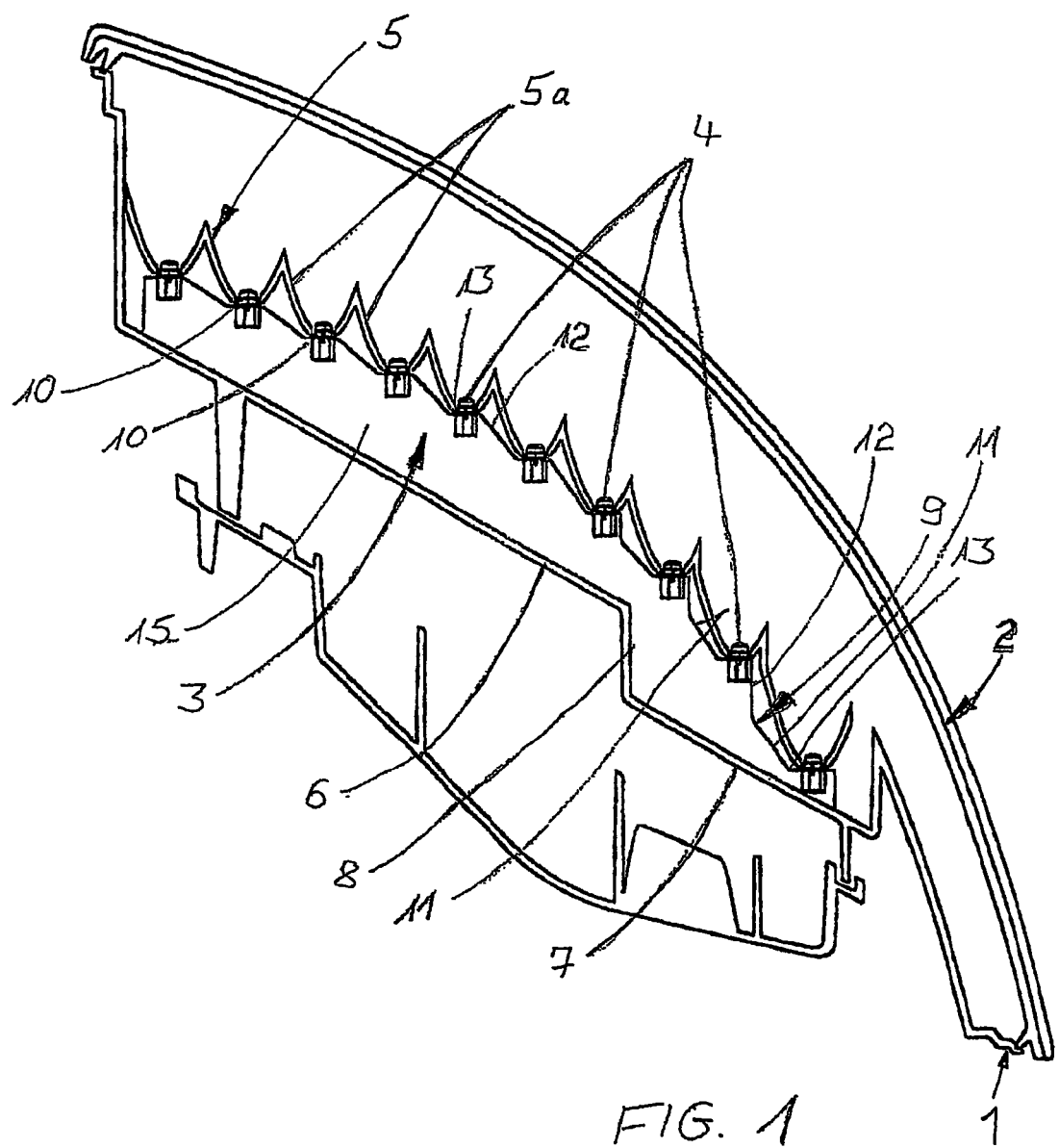
FIG. 1 is a schematic section through a part of a light according to the invention, equipped with a lighting means carrier according to the invention.

FIG. 1 shows a light, which is embodied in the form of a rear light for a motor vehicle. It has a housing 1 whose housing opening is covered by a light pane 2, behind and spaced apart from which is situated a carrier 3, which supports a large number of lighting means embodied in the form of LEDs 4. Each of the LEDs 4 is associated with a segment 5a, which is approximately parabolic in the view according to FIG. 1 and constitutes part of a reflector 5 that is advantageously comprised of a single piece. The LEDs 4 are situated, as will be explained in greater detail below, preferably with approximately the same distance from the light pane 2. The carrier 3 is preferably a printed circuit board and rests with a lower edge 6 against a bottom 7 of the housing 1. The bottom 7 and the edge 6 have a step 8 in the middle. The carrier 3 can be situated edge-on and perpendicular to the light pane 2 and requires only a small amount of installation space.

In the exemplary embodiment shown, the upper edge 9 of the carrier 3 oriented toward the light pane 2 is denticulate in profile. It has right-angled, shoulder-shaped segments 10 spaced apart from one another, which are connected to one another by means of intermediate segments 11. The segments 10 have a shoulder surface 12, which extends obliquely in relation to the light pane 2 and transitions at an angle into a transversely extending shoulder surface 13. The shoulder surface 13 adjoins the intermediate segment 11 at an obtuse angle, which in turn adjoins the shoulder surface 12 at an obtuse angle as well. In the exemplary embodiment shown, the intermediate segments 11 are longer than the shoulder surfaces 12 and 13. The LEDs 4 are attached one after another to the edge 9 of the carrier 3, preferably spaced equidistantly apart. The LEDs 4 are attached to the one side surface 15, in the vicinity of the shoulder-shaped sections 10 of the edge 9. As is clear from FIG. 1, the LEDs 4 are situated parallel to one another so that their longitudinal axes are parallel to the side surface 15 of the carrier 3. As a result, the LEDs 4 rest snugly adjacent to the side surface 15 of the carrier. The LED contact feet, not shown in FIG. 1, are bent at angles and protrude through openings in the carrier 3. On the other side of the carrier, the contact feet are connected to electrical conductor tracks in a known manner.

The LEDs 4 are arranged on the carrier 3 so that they protrude beyond the edge sections 13 in the direction of the light pane 2. The carrier edge 9 extends in relation to the light pane 2 so that the LEDs 4 are situated in a series that follows the light pane contour.

The carrier 3 can also be integrally connected to the reflector 5.

Figure 2:
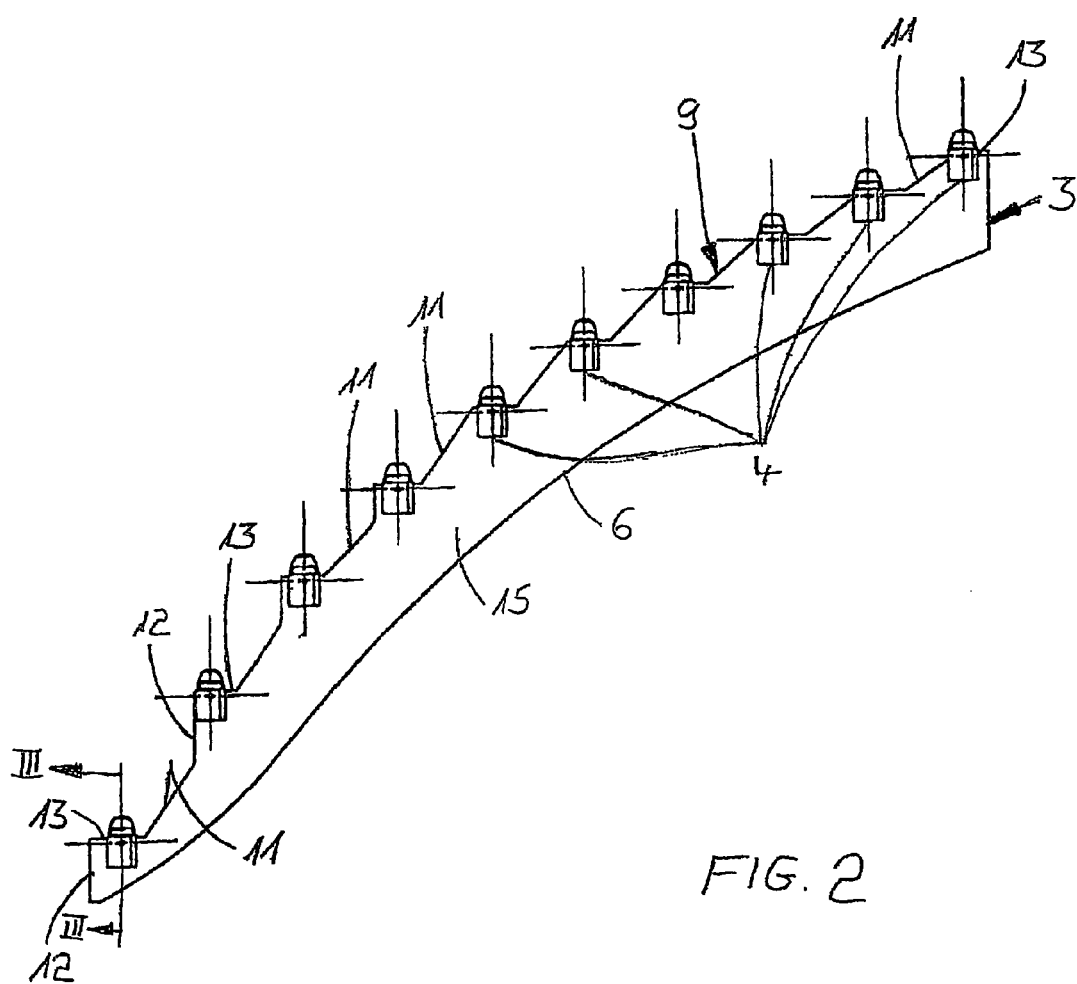
FIG. 2 is a side view of another embodiment form of a carrier according to the invention.

The embodiment form according to FIG. 2 differs from the one in FIG. 1 only in that the edge 6 of the carrier 3 oriented away from the light pane 2 is curved in an approximate S shape. As in the embodiment form according to FIG. 1, the opposite edge 9 is embodied as step-like, with the LEDs 4 situated in the vicinity of the shoulder-shaped segments 12, 13. The LEDs 4 lie in a path that is curved convexly toward the outside, whose course corresponds to the contour of the curved light pane 2.

Figure 3:
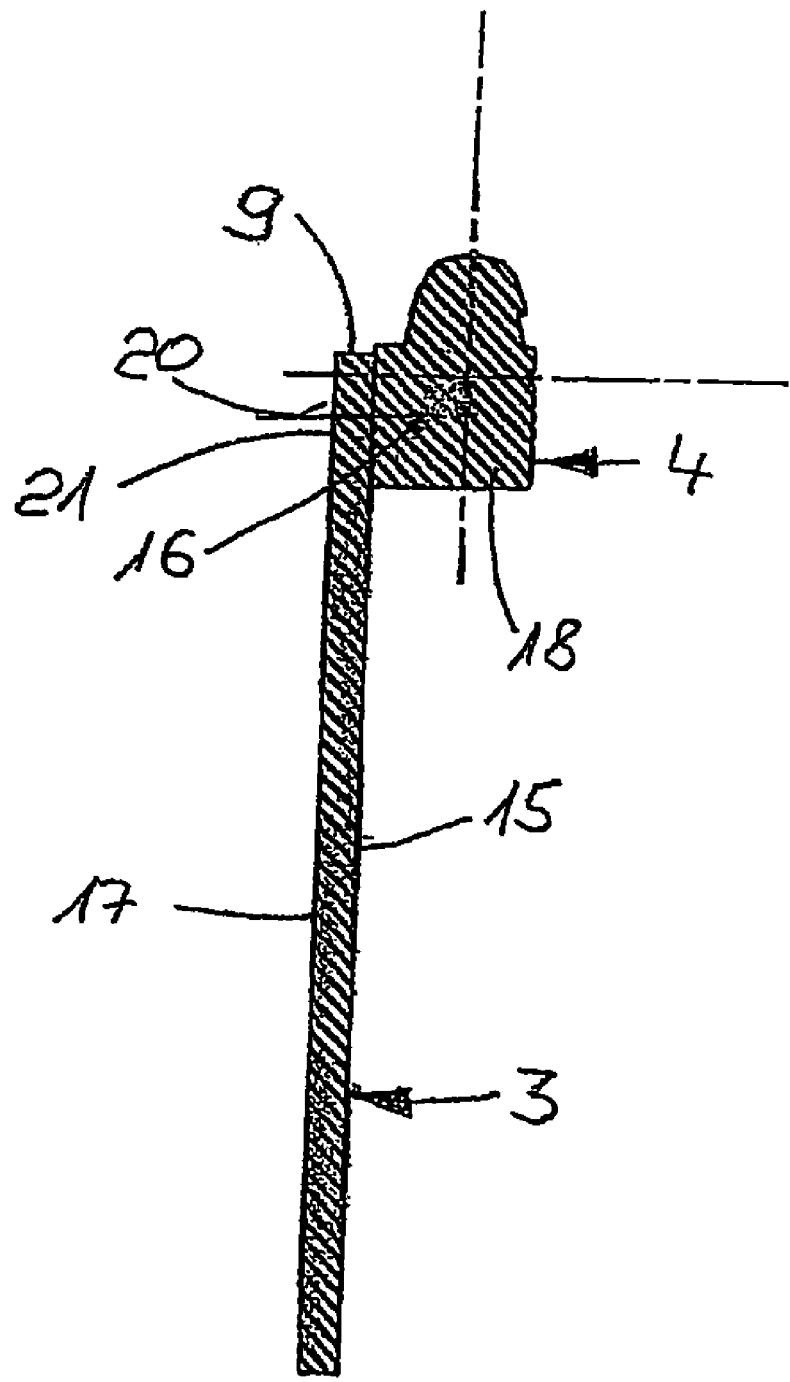
FIG. 3 is a section along the line III-III in FIG. 2.

FIG. 3 shows an enlarged depiction of the attachment of one of the LEDs to the side surface 15 of the carrier 3. The contact feet 16 of the LEDs 4 are accommodated in a protected fashion inside an injection molded body 18 that is molded onto the LEDs. The injection molded body 18 advantageously has a flat contact surface 20 with which it rests against the side wall 15 of the carrier 3. The injection molded body 18 with the LED 4 can be attached to the carrier 3 in any suitable fashion. It is also possible, with a corresponding embodiment, to mold the injection molded body 18 directly onto the carrier 3. The carrier 3 is provided with insertion openings 21 to permit the contact feet 16 to pass through. The contact feet 16 are accommodated in a protected fashion inside the injection molded body 18. On the plate side 17, the contact feet 16 that have been inserted through the openings 21 of the carrier 3 are connected to the printed circuit tracks (not shown) in the manner described above, for example by means of soldering.

The LEDs 4 first come in the form of a lead frame strip in which the LEDs 4 are arranged in a row next to one another. The contact feet 16 of the LEDs 4 are first bent by 90°. The bent contact feet 16 are then extrusion coated to produce the injection molded body 18, which is the shape of a block in the exemplary embodiment. The LEDs 4 are then individually fastened to the carrier 3 in the manner described above. In spite of their bent contact feet 16, the LEDs 4 are brought perpendicularly to the side surface 15 of the carrier 3 and attached to it in the same way as conventional LEDs with straight contact feet.

The contact surface 20 of the injection molded body 18 permits the LEDs 4 to be perfectly aligned on the carrier 3 in relation to the light pane 2. The radiation direction of the LEDs 4 corresponds to the main radiation direction of the light.

The fact that the carrier 3 is embodied in the form of a thin printed circuit board and the LEDs 4 lie flat against the carrier 3 allows the carrier to be mounted even in narrow lights.

The carrier 3, which is embodied the same as the carrier according to FIGS. 2 and 3 is provided with LEDs 4 along its edge 9 on both sides 15, 17. The LEDs 4 spaced apart from one another on the carrier side 15 are situated in the gaps between the LEDs 4 spaced apart from one another on the carrier side 17. The contact feet 16 of the LEDs 4 protrude through beyond the respective opposite carrier side 15, 17. The LEDs 4 are each provided with an injection molded body 18 that corresponds to those provided in the preceding exemplary embodiments.

The two LED rows are spaced apart from each other by a distance that corresponds to the thickness of the carrier 3. This makes it possible to accommodate a large number of LEDs 4 in an extremely small amount of space. By contrast with the exemplary embodiment shown, the LEDs 4 of the two rows can also be situated opposite the carrier from one another.

In the embodiment form according to FIG. 5, two essentially identically embodied carriers 3 and 3a are situated next to and spaced apart from each other. The carrier 3 is embodied the same as the carrier according to FIG. 2. It has the LEDs 4 spaced equidistantly apart from one another on its carrier side 15. The other carrier 3a differs from the carrier 3 only in that it is slightly taller and, in the side view, is approximately trapezoidal in shape. The LEDs 4 are attached to the carrier side 15a. The LEDs 4 are thus provided on the sides 15a, 17 of the two carriers 3, 3a that are oriented toward each other. Appropriate placement of the carriers 3, 3a in relation to each other allows them to be optimally adapted to the respective contour of the light pane 2. Naturally, instead of the two carriers 3 and 3a, wider carriers can also be used if larger light panes are used.

In the embodiment forms described above, the carrier 3, 3a is embodied in the form of a printed circuit board. Plates and the like, which support the LEDs 4 in the above-described manner can also be used as carriers 3, 3a. The supply of current to the LEDs 4 can in this case be provided via lines that are attached to the plates in a suitable fashion.

The lighting means can also be incandescent lamps or other light-emitting elements. The different types of lighting means can also be used in combination.

The LEDs 4 are provided on the carrier 3, 3a so that their axes are parallel to one another. Depending on the application, the LEDs 4 can also be inclined in relation to one another in order to achieve a desired radiating effect.

The LEDs 4 can also, if necessary, be arranged on the carrier 3, 3a in an unevenly distributed fashion. Depending on the function of the LEDs 4, they can be colored and emit colored light. The carrier 3, 3a, with the LEDs 4 can, for example, be used for brake lights or turn signal lights.

The carrier 3, 3a with the lighting means 4 can be used wherever there is only a small amount of available installation space, e.g. inside the motor vehicle in places like the dashboard, the headliner, and the like.

The LEDs 4 can also be embodied without the injection molded body 18. The contact feet 16 then protrude freely and are connected to the electrical supply line in the manner described above.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A rear light for motor vehicles, comprising:
a light pane having a contour;
a carrier situated behind the light pane; and
a plurality of lighting sources situated on the carrier such that the plurality of lighting sources follow the contour of the light pane;
the plurality of light sources having a plurality of axis longitudinally extending through the plurality of light sources;
the carrier having a sidewall; and
the plurality of lighting sources attached to the sidewall of the carrier and lying against the sidewall of the carrier such that the plurality of axis of the plurality of light sources are parallel to the sidewall of the carrier.

2. The light according to claim 1, wherein the carrier is oriented transversely, to the light pane.

3. The light according to claim 1, wherein the plurality of light sources extend essentially parallel to the sidewall of the carrier to which it is attached.

4. The light according to claim 1, wherein the carrier has insertion openings for contact parts of the plurality of lighting sources.

5. The light according to claim 4, wherein the insertion openings are situated spaced apart from the edge of the carrier oriented toward the light pane.

6. The light according to claim 1, further comprising:
a second plurality of lighting sources having a plurality of axis longitudinally extending through the second plurality of light sources;
the carrier having another sidewall;
the second plurality of lighting sources attached to the other sidewall of the carrier and lying against the other sidewall of the carrier such that the plurality of axis of the second plurality of light sources are parallel to the other sidewall of the carrier.

7. The light according to claim 1, wherein the carrier has an edge and the plurality of light sources are arranged one after another, preferably spaced equidistantly apart, at the edge of the carrier oriented toward the light pane.

8. The light according to claim 1, further comprising at least one additional carrier spaced apart from the carrier.

9. The light according to claim 1, wherein the carrier has an edge oriented toward the light pane and the edge oriented toward the light pane has a denticulate profile.

10. The light according to claim 1, wherein each of the plurality of lighting sources is associated with a reflector.

11. The light according to claim 10, wherein the carrier and the reflector are integrally connected to each other.

12. The light according to claim 1, wherein the carrier is embodied in the form of a printed circuit board.

13. The light according to claim 1, further comprising:
at least one additional carrier having a sidewall oriented toward the sidewall of the carrier; and
a plurality of lighting sources situated on the sidewall of the additional carrier.

* * * * *